(12) United States Patent  
Blom et al.

(10) Patent No.: US 7,946,197 B2
(45) Date of Patent: May 24, 2011

(54) BREAKER RACKING TOOL

(75) Inventors: Ralph Blom, Brighton (CA); Dennis Kowalchuk, Bowmanville (CA); Mike Chaisson, New Castle (CA); Rob Johnson, Coburg (CA)

(73) Assignee: Ontario Power Generation Inc., Toronto (CA)

( * ) Notice: Subject to any disclaimer, the term of this patent is extended or adjusted under 35 U.S.C. 154(b) by 462 days.

(21) Appl. No.: 12/055,830

(22) Filed: Mar. 26, 2008

(65) Prior Publication Data

US 2008/0257694 A1    Oct. 23, 2008

Related U.S. Application Data

(60) Provisional application No. 60/896,982, filed on Mar. 26, 2007.

(51) Int. Cl.
B25B 17/00 (2006.01)
H01H 33/42 (2006.01)

(52) U.S. Cl. .................... 81/57.29; 200/50.25

(58) Field of Classification Search ............... 81/57.29, 81/177.2; 200/50.02, 50.24, 50.25
See application file for complete search history.

(56) References Cited

U.S. PATENT DOCUMENTS

| | | | | | |
|---|---|---|---|---|---|
| 877,571 | A | * | 1/1908 | Larson | 81/57.29 |
| 1,199,823 | A | * | 10/1916 | Sadtler | 81/57.29 |
| 1,295,799 | A | * | 2/1919 | Sanborn | 81/57.29 |
| 1,333,532 | A | * | 3/1920 | Berk | 81/57.29 |
| 1,526,502 | A | * | 2/1925 | Pilger, Jr. | 81/57.29 |
| 3,111,049 | A | * | 11/1963 | Brehmer | 81/57.26 |
| 3,644,951 | A | * | 2/1972 | Colburn | 7/170 |
| 3,733,936 | A | * | 5/1973 | Flynn | 81/58.1 |
| 3,972,252 | A | * | 8/1976 | Hunter | 81/57.29 |
| 4,470,328 | A | * | 9/1984 | Landis | 81/53.1 |
| 4,510,825 | A | * | 4/1985 | Neron et al. | 81/57.29 |
| 4,813,308 | A | * | 3/1989 | Petrus | 81/57.29 |
| 5,630,343 | A | * | 5/1997 | Begin | 81/57.46 |
| 5,765,453 | A | * | 6/1998 | Mims | 81/53.11 |
| 5,794,495 | A | * | 8/1998 | Anderson | 81/53.1 |
| 6,009,776 | A | * | 1/2000 | Warren | 81/57.29 |

(Continued)

OTHER PUBLICATIONS

"Safety Remote Breaker Racking System", 2003 SARRACS Siemens Global network of innovation.
"Right Angle Drive Unit", 2006 ToolBarn. com.

(Continued)

*Primary Examiner* — David B Thomas
(74) *Attorney, Agent, or Firm* — Calfee Halter & Griswold LLP

(57) ABSTRACT

Disclosed is a racking tool for use with a breaker having a frontwardly-projecting racking screw, the screw being rotatable, about a frontwardly-orientated screw axis, between connected and disconnected positions. The racking tool comprises: a gripping tool that, in use, engages said screw and is rotatable about the screw axis to drive the screw between the connected and disconnected positions; an angle drive mechanism coupled to the gripping tool: and a shaft having a first end operatively coupled to the drive mechanism, a second end and a shaft axis extending from the first to the second end, the shaft, in use, being angularly orientated to the screw axis and adapted such that, with the gripping tool engaged with said racking screw, the screw can be rotated between the connected and disconnected positions by a user standing to one side of the breaker and rotating the shaft about its axis.

17 Claims, 10 Drawing Sheets

U.S. PATENT DOCUMENTS

| | | | | |
|---|---|---|---|---|
| 6,293,172 | B1* | 9/2001 | Smith | 81/57.13 |
| 6,619,159 | B2* | 9/2003 | Galat | 81/57.13 |
| 6,875,935 | B2* | 4/2005 | Abrahamsen et al. | 200/50.24 |
| 7,340,981 | B1* | 3/2008 | Walter | 81/57.29 |
| 2007/0125203 | A1* | 6/2007 | Nguyen | 81/57.29 |

OTHER PUBLICATIONS

"Avoid Devastating Electrical Arc Flash Accidents by Following These Safety Standards", Weigel, Joseph, Square D. Services Marketing, undated, admitted prior art.

* cited by examiner

BREAKER RACKING TOOL

CROSS REFERENCE TO RELATED APPLICATIONS

This application claims the benefit of U.S. Provisional Patent Application Ser. No. 60/896,982, filed on Mar. 26, 2007 and entitled Breaker Racking Tool, the entire disclosure of which is incorporated by reference to the extent that it does not conflict with the present application.

FIELD OF THE INVENTION

The present invention relates to the field of breaker racking.

BACKGROUND OF THE INVENTION

Drawout-style electrical circuit breakers are connected and disconnected by moving breakers thereof physically away from and towards a bus. These actions are done with a tool known in the industry as a "racking" wrench, and the processes of disconnecting and connecting breakers are collectively known in the art as "racking" breakers.

Incidents of serious and sometimes fatal injury can occur if circuit breakers on a live bus fault while being racked.

The current OSHA Standard (29CFR-1910-S-App. "A"-NFPA70E) requires that personnel wear full-body flash suits during racking procedures on energized systems. However, as operators stand within the flash boundary in a typical racking operation, they are still at considerable risk should a fault explosion occur. The need for flash suits also adds cost and inconvenience to racking operations.

An automated racking device is known in the art, in the form of a robot equipped with a racking wrench, which can be remotely operated by personnel outside the flash zone. This device is admirable in its ability to improve safety, but is relatively costly and cumbersome.

SUMMARY OF THE INVENTION

The invention comprises a breaker racking tool.

According to one aspect, the racking tool can be for use with a breaker of the type having a front and a frontwardly-projecting racking screw, the racking screw being rotatable, about a frontwardly-orientated screw axis, between connected and disconnected positions. This racking tool comprises: a gripping tool that, in use, engages said racking screw and is rotatable about the screw axis to drive the racking screw between the connected and disconnected positions; an angle drive mechanism operatively coupled to the gripping tool; and an elongate shaft having a first end operatively coupled to the angle drive mechanism, a second end, and a shaft axis extending from the first end to the second end, the shaft, in use, being orientated at an angle to the screw axis and adapted such that, with the gripping tool engaged with said racking screw, the racking screw can be rotated between the connected and disconnected positions by a user standing to one side of the breaker and rotating the shaft about the shaft axis.

According to another aspect, the racking tool can be for use with a breaker of the type having a front cover and a racking screw. The front cover has an aperture surrounded by an edge. The racking screw is disposed behind the front cover in alignment with the aperture, projects frontwardly towards the aperture and is rotatable, about a frontwardly-orientated screw axis, between connected and disconnected positions. This racking tool comprises a gripping tool, an angle drive mechanism, an elongate shaft and an engagement mechanism. The gripping tool has an annular peripheral groove and, in use, engages said racking screw and is rotatable about the screw axis to drive the racking screw between the connected and disconnected positions. The angle drive mechanism is operatively coupled to the gripping tool. The elongate shaft has a first end operatively coupled to the angle drive mechanism, a second end, and a shaft axis extending from the first end to the second end. The shaft, in use, is orientated at an angle to the screw axis and is adapted such that, with the gripping tool engaged with said racking screw, the racking screw can be rotated between the connected and disconnected positions by a user standing to one side of the breaker and rotating the shaft about the shaft axis. The engagement mechanism is adapted to hold the gripping tool in selectively-releasable engagement with said racking screw and includes a clip fitted around the edge of the front cover in use, a bushing mounted for rotation in the annular groove of the gripping tool and a spring connecting the clip to the bushing.

According to yet another aspect, the racking tool can be for use with a breaker of the type having a front cover, a lug and a racking screw. The front cover has an aperture. The lug extends frontwardly through and to one side of the aperture. The racking screw is disposed behind the front cover in alignment with the aperture, projects frontwardly towards the aperture and is rotatable, about a frontwardly-orientated screw axis, between connected and disconnected positions. This racking tool comprises a gripping tool, an angle drive mechanism, an elongate shaft and an engagement mechanism. The gripping tool, in use, engages said racking screw and is rotatable about the screw axis to drive the racking screw between the connected and disconnected positions. The angle drive mechanism is operatively coupled to the gripping tool. The elongate shaft has a first end operatively coupled to the angle drive mechanism, a second end, and a shaft axis extending from the first end to the second end, the shaft, in use, being orientated at an angle to the screw axis and adapted such that, with the gripping tool engaged with said racking screw, the racking screw can be rotated between the connected and disconnected positions by a user standing to one side of the breaker and rotating the shaft about the shaft axis. The engagement mechanism is adapted to hold the gripping tool in selectively-releasable engagement with said racking screw and includes a spring, a bracket and a clip. The spring is disposed about the gripping tool and secured at one end thereto. The bracket is secured to the other end of the spring. The clip is rigidly mounted to the bracket and includes a jaw spring-biased for movement from an open position whereat, when the gripping tool is engaged with the racking screw, the gripping tool can be removed from the racking screw, and a closed position whereat, when the gripping tool is engaged with the racking screw, the jaw engages the lug to lock the gripping tool against removal from the racking screw.

Racking tools constructed according to the invention are relatively inexpensive to manufacture and relatively convenient to use, yet at the same time, offer great advantage in terms of personal safety by allowing operators to stand to one side of the breaker, away from the area in which flash injuries would otherwise be most likely to occur.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying figures. In the figures, wherein exemplary embodiments are described and which are briefly described hereinafter, like reference numerals represent like parts throughout.

BRIEF DESCRIPTION OF THE FIGURES

FIG. 6 is a view similar to FIG. 5, with a clip of the structure of

FIG. 3 fitted over the edge of the cover;

DETAILED DESCRIPTION

Figure 1:
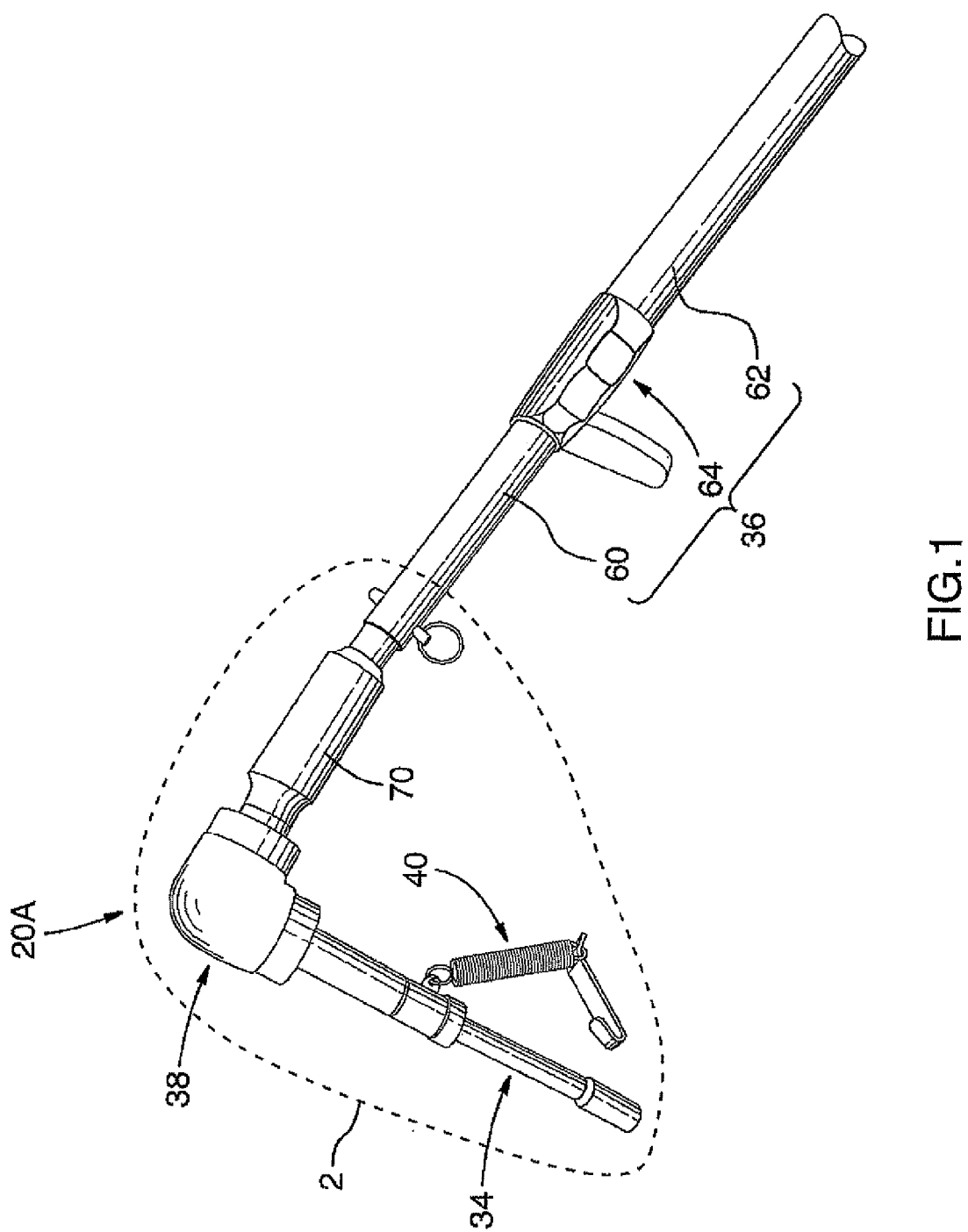
FIG. 1 is a view of a racking tool constructed according to an embodiment of the invention.
Figure 2:
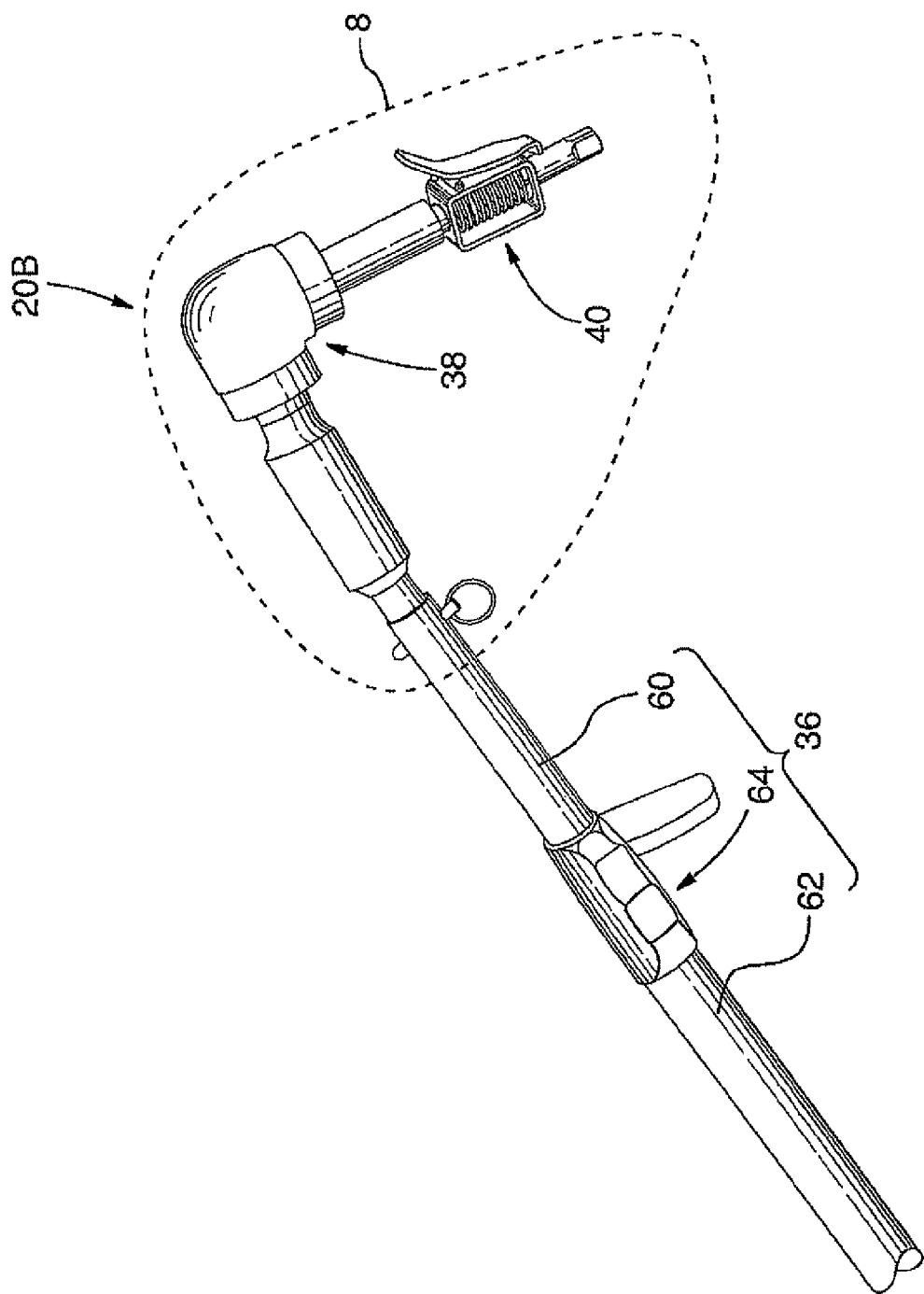
FIG. 2 is a view of a second racking tool according to an embodiment of the invention.

Two breaker racking tools constructed according to the invention are shown in FIG. 1 and FIG. 2 and designated generally, respectively, as 20A and 20B.

Figure 4:
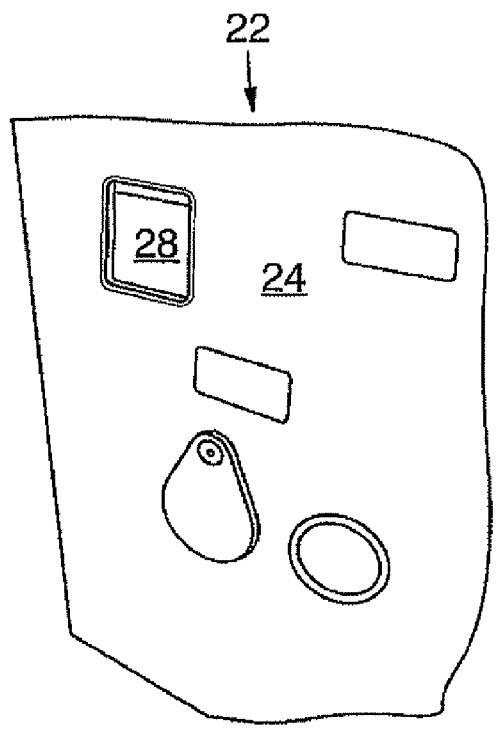
FIG. 4 is a front view of an ITE circuit breaker, with an access panel to an aperture thereof shown in a closed position.
Figure 5:
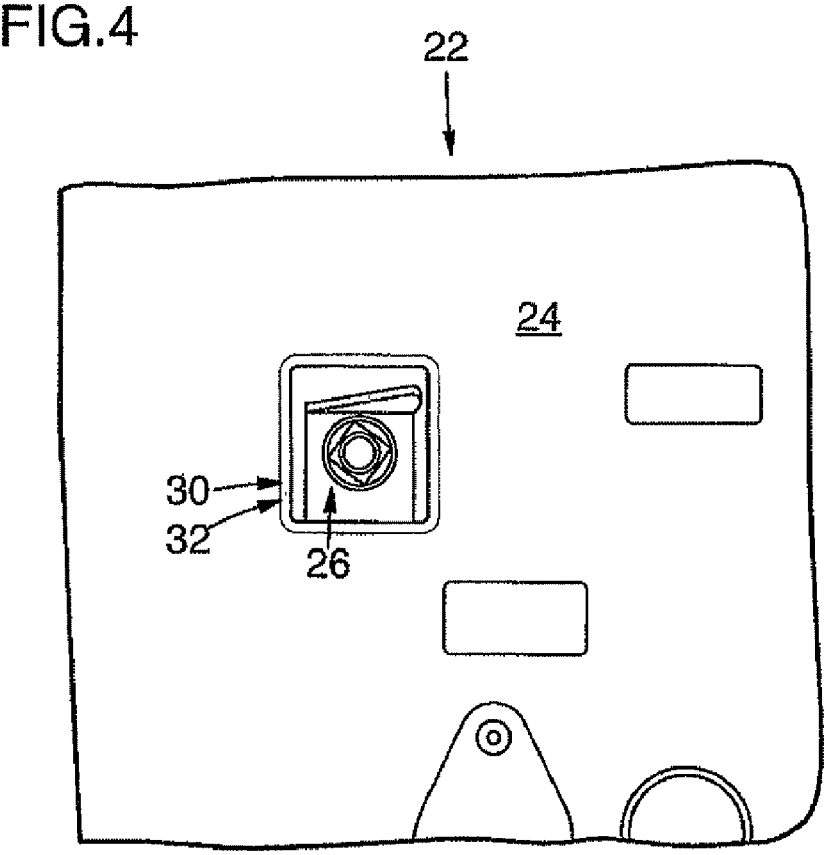
FIG. 5 is a view similar to FIG. 4, with the access panel shown in an open position to reveal an aperture.

Reference will firstly be made to tool 20A, which is for use with an ITE breaker 22, as shown in FIGS. 4 and 5. This breaker 22 is of the type having a front cover 24, a racking screw 26 and an access panel 28. The front cover 24 has an aperture 30 surrounded by an edge 32. The racking screw 26 is disposed behind the access panel 28 in alignment with the aperture 30, projecting frontwardly towards the aperture, and is rotatable, about a frontwardly-orientated axis, between connected and disconnected positions, about 90° apart from one another. The access panel 28 is slidable between a closed position, shown in FIG. 4, whereat it occludes the aperture, and an open position, shown in FIG. 5, wherein it gives access to the racking screw 26.

With reference to FIG. 1, this racking tool 20A comprises a gripping tool 34, an elongate shaft 36, an angle drive mechanism 38, an engagement mechanism 40 and outer sheath 70.

Figure 13:
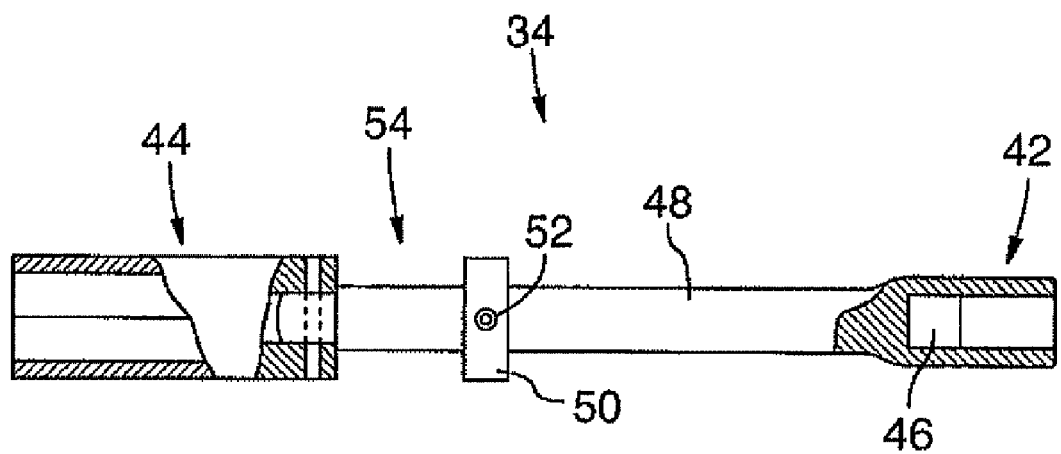
FIG. 13 is a view of encircled structure 14 of FIG. 3, with portions removed for clarity.

The gripping tool 34 is a socket tool, and is shown in isolation in FIG. 13. One end terminates in and is defined by an $^{11}/_{16}$" hex-head socket 44 which is received by a socket extension 48 which terminates in a $^{3}/_{8}$" square female receptacle 42. At the base of the $^{3}/_{8}$" receptacle 42, a $^{3}/_{8}$" cubic rare earth magnet 46 with 11 lbs. pull is adhesively secured. A $^{1}/_{2}$" shoulder collar 50 is secured by a set screw 52 to the socket extension 48 in spaced relation to socket 44, to define, intermediate the ends of the socket tool 34, an annular groove 54.

Figure 3:
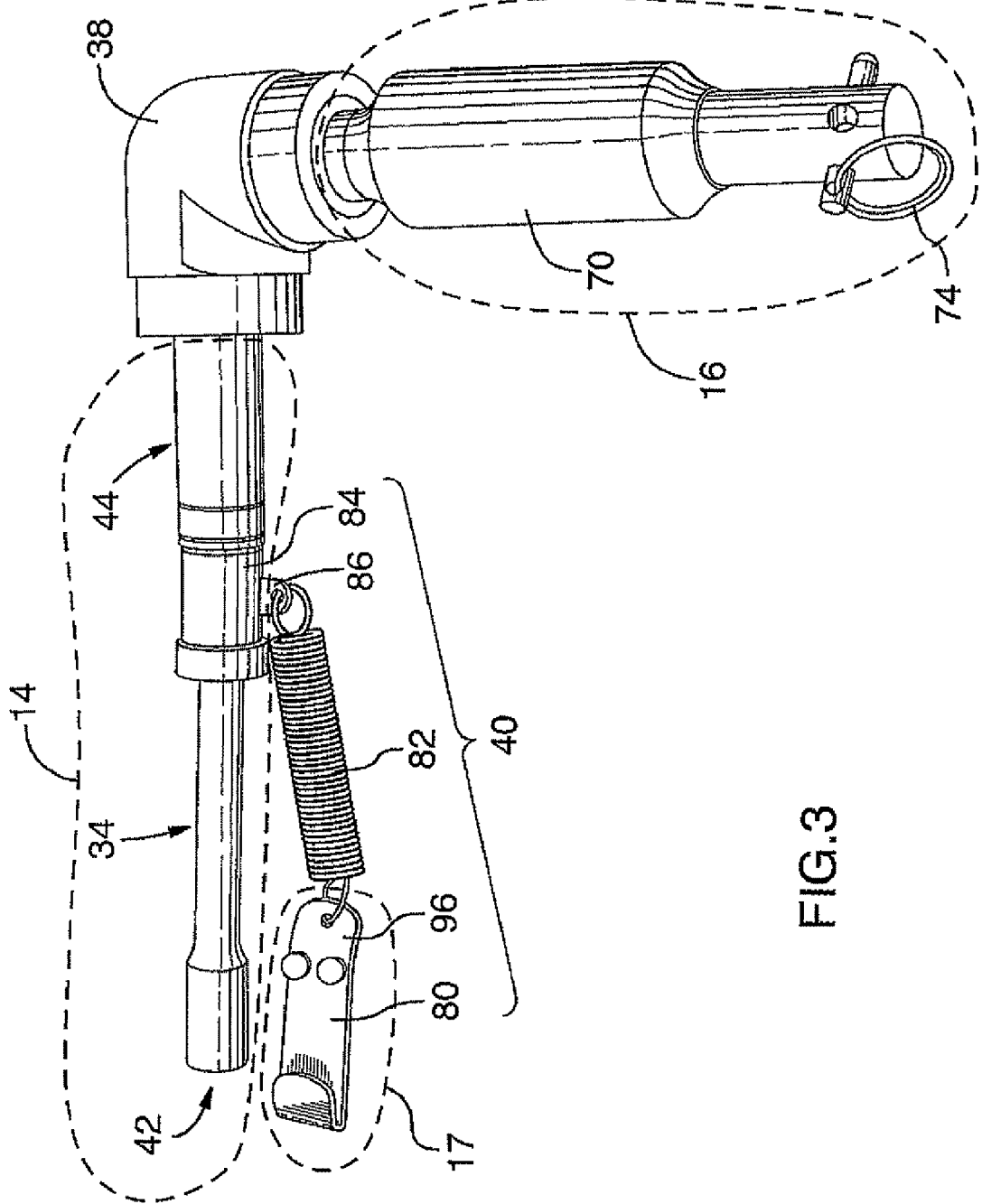
FIG. 3 is a view of the structure of encircled area 2 of FIG. 1.
Figure 14:
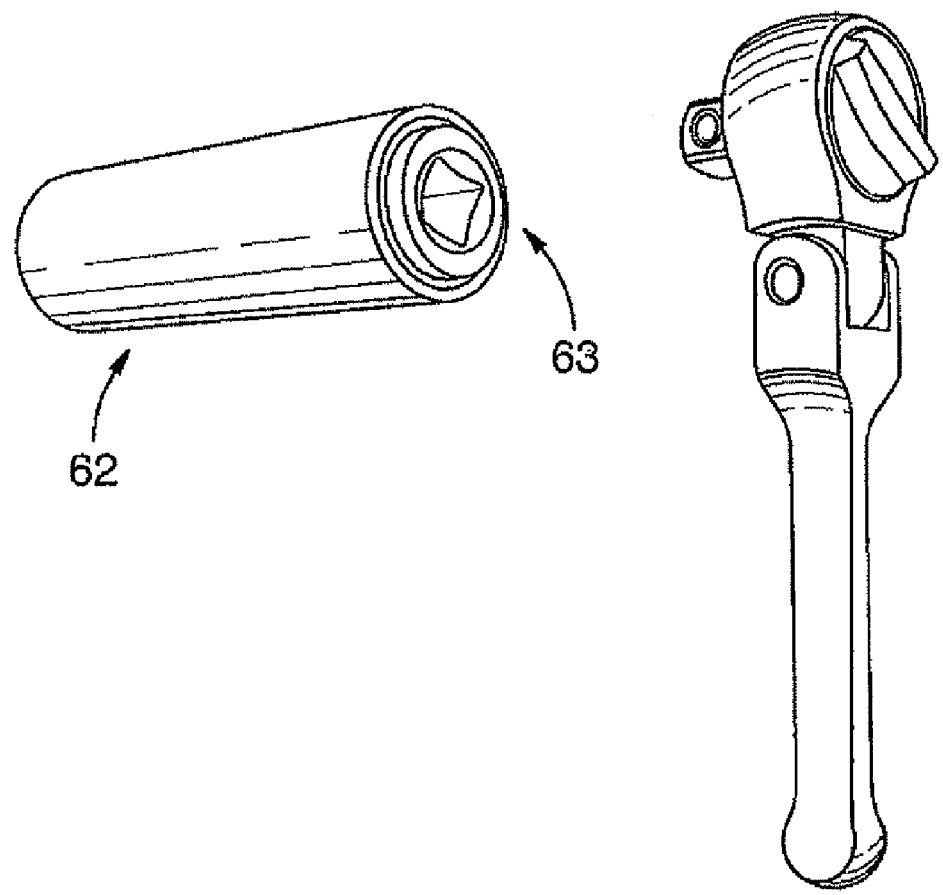
FIG. 14 is an exploded view of encircled structure 15 in FIG. 7.
Figure 15:
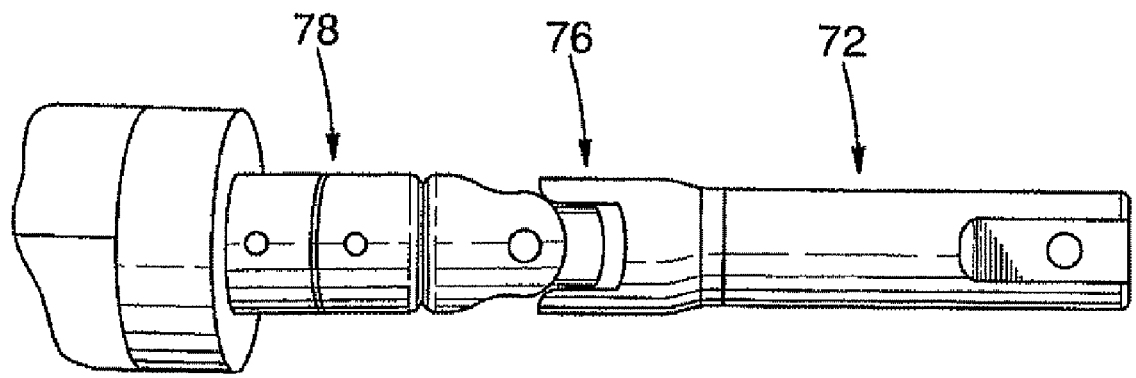
FIG. 15 is a view of encircled structure 16 in FIG. 3, with portions removed for clarity.

Returning to FIG. 1, the elongate shaft 36 comprises inner aluminum 60 and outer fibreglass 62 tubes of about 6' in length, arranged in telescopic relation and provided with a locking mechanism 64. The inner 60 and outer 62 tubes can be extended to about 12' in total length, and selectively, releasably locked in such position, both as against telescopic movement and as against relative rotation. The free end of the outer fiberglass tube terminates in a $^{1}/_{2}$" square female socket 63, as shown in FIG. 14. As shown in FIG. 15, which partially shows the tool 20A without the shaft 36 and with an outer sheath 70 removed for clarity, a crank rod adapter 72 is provided, which in the tool 20A is secured by a quick connect-pin 74, as shown in FIG. 3, to the free end of the aluminum tube. Crank rod adapter 72 is secured by a spring pin (not shown) to a $^{1}/_{2}$" universal joint 76, which itself is secured by a spring pin (not shown) to a $^{11}/_{16}$" hex-head socket 78.

The angle drive mechanism 38 is operatively coupled between the gripping tool 34 and the elongate shaft 36 and takes the form of a right-angle drive with $^{11}/_{16}$" male hex-head drive and driven spindles (neither shown), orientated 90° from one another, with no mechanical advantage provided as between the drive and driven spindles, the driven spindle being rigidly secured to the hex-head socket 78 at the end of the aluminum tube and the drive spindle being rigidly secured to the hex-head socket 44 of the gripping tool 34.

With reference to FIG. 3, the engagement mechanism 40 includes a clip 80, a bushing 84, and spring 82.

Figure 16:
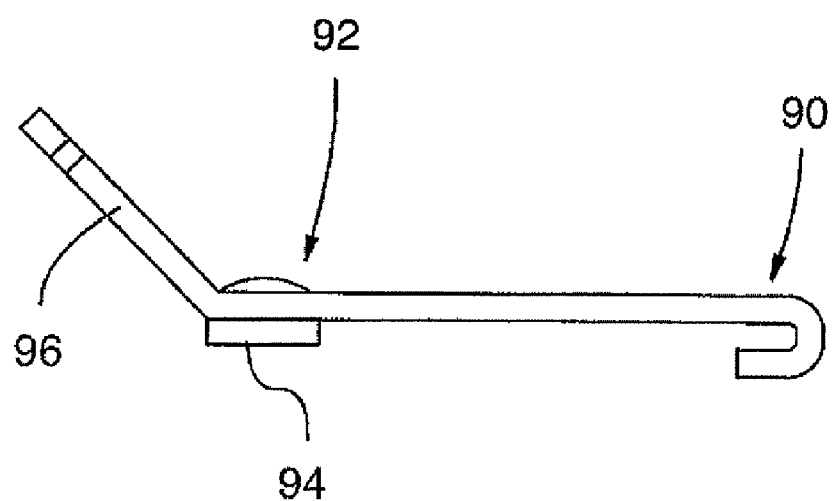
FIG. 16 is a view of encircled structure 17 in FIG. 3.

As best seen in FIG. 16, the clip 80 has an upper end 90 and a lower end 92. The upper end 90 defines a U-shaped profile. The lower end 92 has a $^{3}/_{8}$" rare earth magnet 94 pop-riveted thereto, and a flange 96 extending therefrom.

The bushing 84 is mounted for rotation in the annular groove 54 of the gripping tool 34, as shown in FIG. 3.

The spring 82 is a $^{3}/_{4}$" tension spring secured at one end to the flange 96 of the clip 80 and at the other end to the bushing 84 by means of an eye bolt 86.

Figure 7:
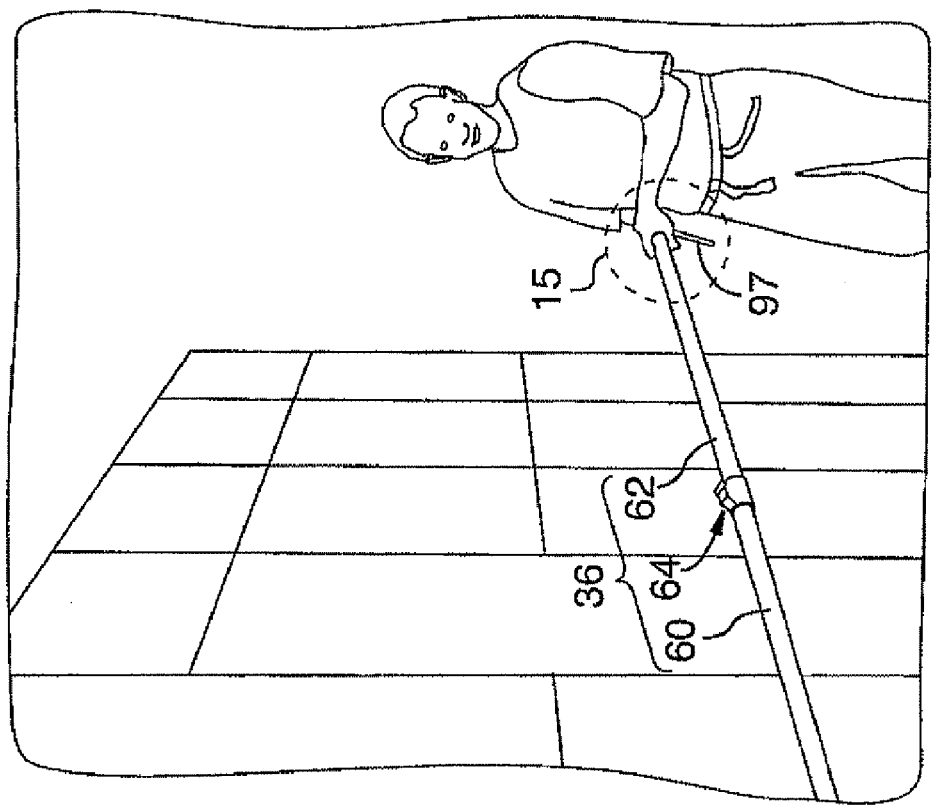
FIG. 7 is a partial view of the racking tool which includes the structure of FIG. 2 in use.
Figure 6:
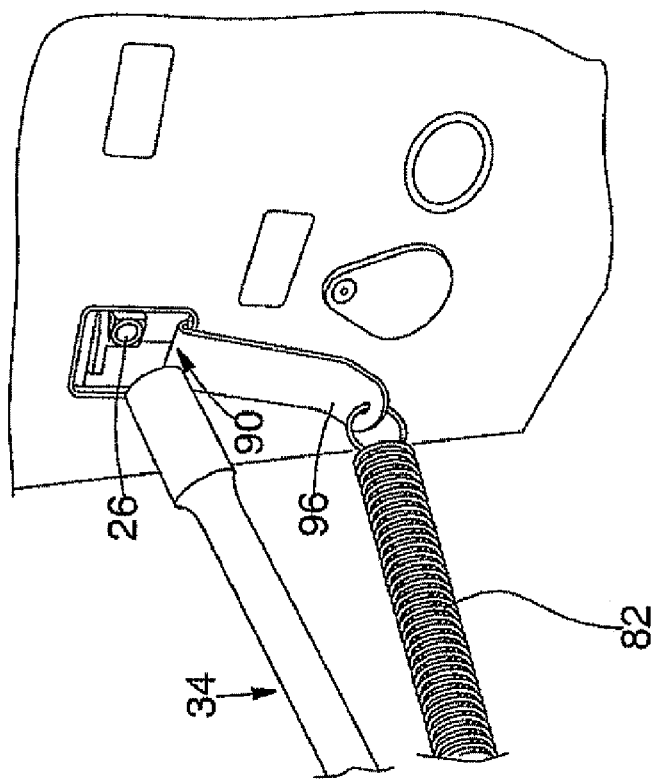

In use, the access panel 28 is moved to the open position, as shown in FIG. 5 (the shut position is shown in FIG. 4), the shaft is extended to a desired, usually maximum, length and locked, and the U-shaped portion 90 of the clip 80 is fitted over the edge of the cover which surrounds the aperture, as shown in FIG. 6. Magnet 94 assists in maintaining the position of the clip 80. Thereafter, the racking screw 26 is engaged with the gripping tool 34, whereupon tension provided by the spring 82 tends to maintain the gripping tool 34 in said engagement. The gripping tool 34 is thus held in selectively-releasable engagement with the racking screw 26. As indicated in FIG. 7 the operator/user then proceeds to the end of the shaft 36, and rotates same by means of a ratchet wrench 97 fitted in socket receptacle 63 (see also FIG. 15). The rotation of the shaft 36 about its own axis in this manner is translated into rotation of the socket tool 34, and commensurate rotation of the racking screw 26 between its connected and disconnected positions. As the operator at this point is standing to one side of the breaker 22, well outside the typical flash boundary, the risk of injury associated with any inadvertent flash is negated, provided normal safety precautions are taken. The universal joint 76 gives some flexibility to the operator in terms of position, so that the shaft 36 can be threaded through any obstacles between the chosen location of the operator/user and the breaker 22 to be racked.

A second embodiment of the tool, shown in FIG. 2 differs only in the structure of the engagement mechanism and gripping tools employed, which difference flows from the structural difference in the breaker with which it is intended to be used, and thus is described herein only briefly.

Figure 9:
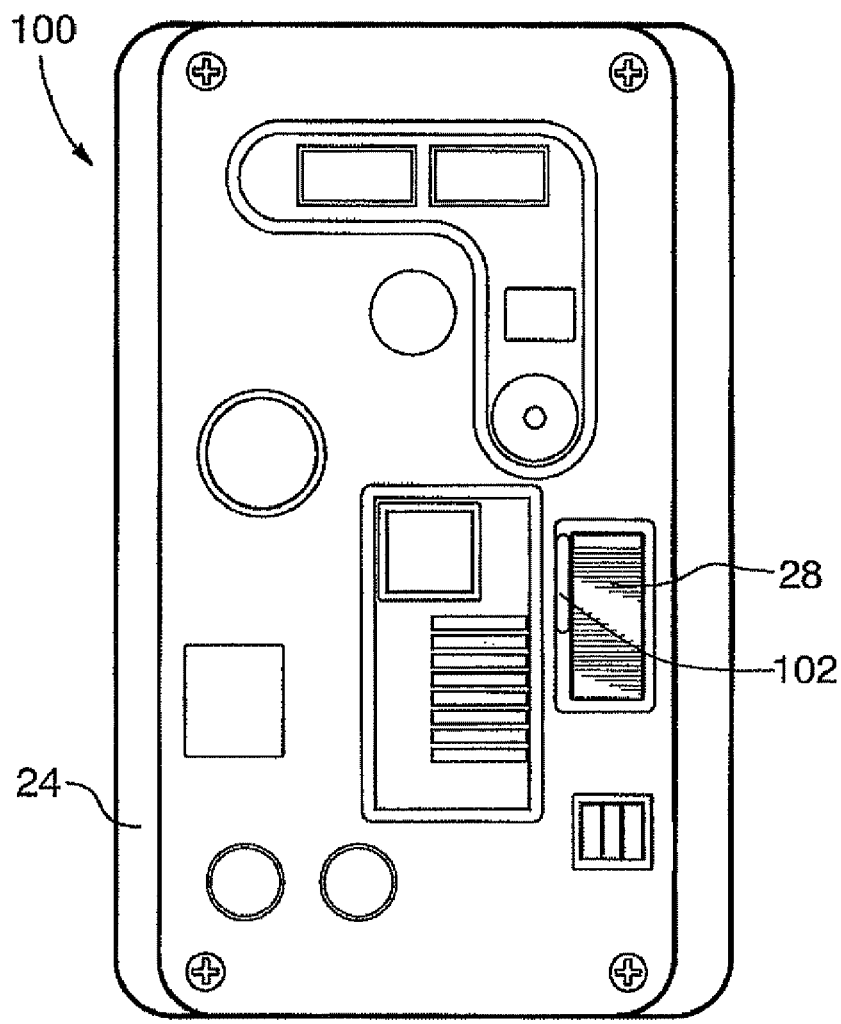
FIG. 9 is a front view of a FEDERAL PIONEER circuit breaker, with an access panel in a cover thereof shown in a closed position.
Figure 10:
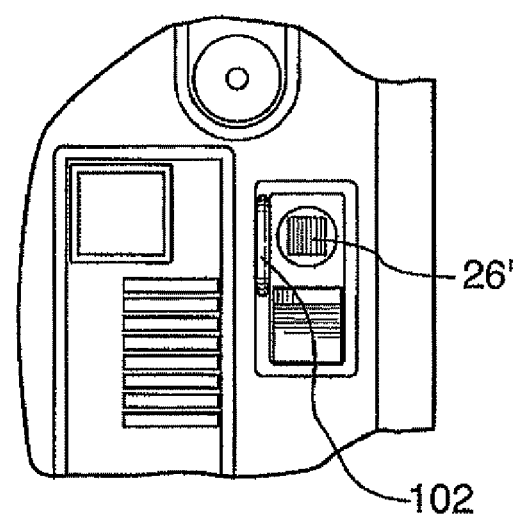
FIG. 10 is a view similar to FIG. 3, with the access panel shown in an open position to reveal an aperture.

Specifically, this tool is adapted for use with a Pioneer Breaker 100, as shown in FIG. 9 with the access panel 28 in a closed position and in FIG. 10 with the access panel in an open position.

Figure 12:
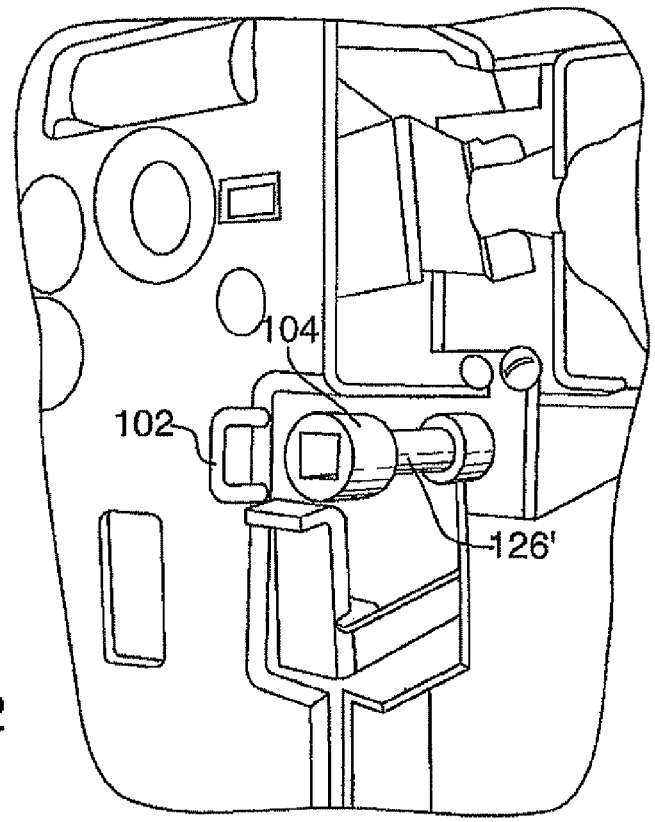
FIG. 12 is a view of the structure of FIG. 9, with a cover portion thereof removed for clarity.

As best seen in FIG. 10, this breaker 100 differs in construction from the ITE breaker 22 in the inclusion in the former of a lug 102 which projects through the aperture and to one side thereof, and in the nature of the racking screw 26', which terminates in a ½" square female socket 104. This racking screw 26' is best seen in FIG. 12, wherein the cover 24 of this breaker 100 has been removed for clarity.

Figure 8:
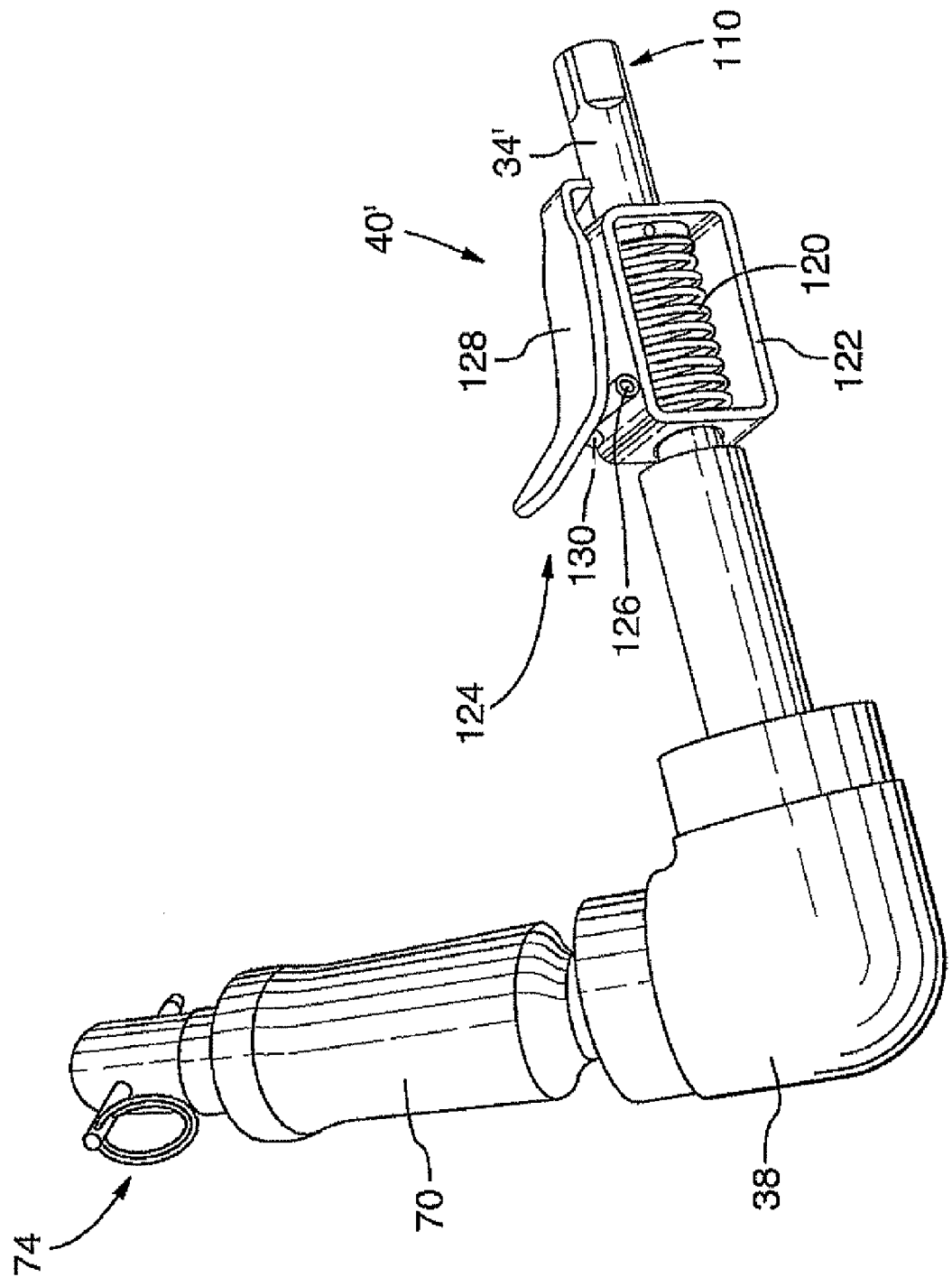
FIG. 8 is a view of the structure of encircled area 8 in FIG. 2.

To accommodate and take advantage of this structural difference, the gripping tool 34' of racking tool 20B terminates in a ½" square drive 110 and the engagement mechanism 40' includes a primary spring 120, a bracket 122 and a clip 124, as best seen in FIG. 8. Bracket 122 and clip 124 rotate freely around gripping tool 34.

The primary spring 120 is a 3"×¾" compression spring disposed about gripping tool 34' and secured at one end thereto.

The bracket 122 surrounds the primary spring 120, has the gripping tool 34' extending therethrough, and is secured to the other end of the primary spring 120.

The clip 124 includes a hinge 126 rigidly mounted to the bracket 122, a jaw 128 welded the hinge 126 and a secondary spring 130 biasing the jaw 128 for movement from an open position to a closed position.

Use of the racking tool of FIG. 2 again commences with movement of the access panel 28 to the open position as shown in FIG. 10 and extension of the shaft 36 to and locking of the shaft 36 at its maximum length. However, herein, as a next step, the gripping tool 34' is fully inserted into the racking screw 26'. Interference between the jaw 128 and lug 102 causes the compression spring 120 to compress, and move the bracket 122 frontwardly with respect to the gripping tool 34', during this insertion procedure. The jaw 128 is manually manipulated against the force of the secondary spring 130 to the open position, to remove the interference, whereupon the spring 120 expands to its normal position and the bracket 122 and jaw 128 slide rearwardly.

Figure 11:
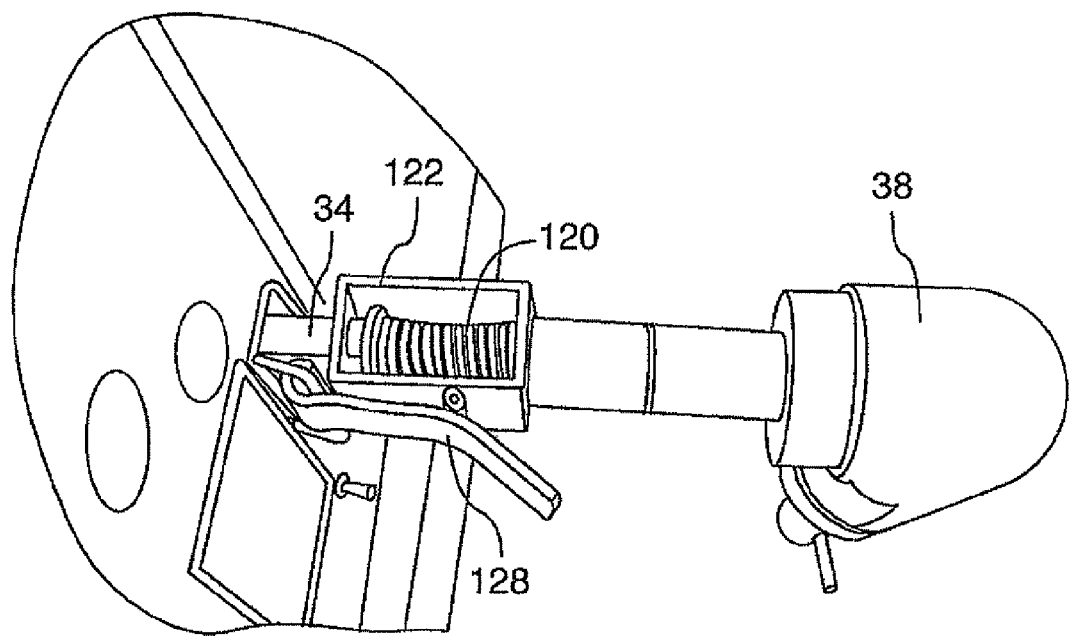
FIG. 11 is a view of the structure of FIG. 8 in use with the structure of FIG. 10 or FIG. 12.

Pressure on the jaw 128 is thereafter released by the user, whereupon the jaw 128 moves to its closed position, as shown in FIG. 11, to engage the lug 102 and lock the gripping tool 34' against removal from the racking screw 26. Racking can then be performed as required in the manner as previously described. As the gripping tool 34' and bracket 122 are connected to one another only by the spring 120, relative rotation of the gripping tool 34' and bracket 122 to the extent necessary for racking is accommodated by the spring 120. Upon completion, the tool 20B can be released from the breaker by manipulation of the jaw 128 to the open position.

While but two embodiments of the present invention have been herein shown and described, it will be understood that various changes in size and shape of parts may be made.

For example, whereas a right angle drive with no mechanical advantage is herein described, coupled by means of a universal joint, drive mechanisms including mechanical advantage and at angles other than 90° could readily be substituted, and the universal joint could be omitted altogether, albeit with some impact upon flexibility in use.

Further, whereas but two gripping tools have been described, it will be evident that the gripping tool will be routinely modified as necessary to mate with the specific racking screw provided on any given breaker with which the tool is to be used.

As well, whereas the elongate shaft described is telescopic, with an inner aluminum portion and an outer fiberglass portion, non-telescopic shafts could be employed, as could shafts of other materials and lengths.

Additionally, whereas the use of a socket or ratchet wrench is described, to facilitate rotation of the shaft about its axis in use, it will be evident that the shaft could simply be rotated by hand, particularly if mechanical advantage was provided in the angle drive mechanism employed, and other mechanisms could be employed to provide mechanical advantage at the second end of the shaft, such as a tire lug wrench or a torque wrench.

Further, whereas the tools described herein have been constructed, for ease of manufacturing, largely from readily available stock components, it will be recognized by persons of ordinary skill that tools accordingly to the invention might, in large volumes, be constructed more cheaply through custom-made components embodying the same or similar functionality as those described and shown herein.

It will be evident that these modifications may be made without departing from the spirit or scope of the invention. Accordingly, the invention should be understood as being limited only by the claims appended hereto, purposively construed.

The invention claimed is:

1. A racking tool for use with a breaker of the type having a front and a frontwardly-projecting racking screw, the racking screw being rotatable, about a frontwardly-orientated screw axis, between connected and disconnected positions, the racking tool comprising:
   a gripping tool that, in use, engages said racking screw and is rotatable about the screw axis to drive the racking screw between the connected and disconnected positions;
   an angle drive mechanism operatively coupled to the gripping tool;
   an elongate shaft having a first end operatively coupled to the angle drive mechanism, a second end, and a shaft axis extending from the first end to the second end, the shaft, in use, being orientated at an angle to the screw axis and adapted such that, with the gripping tool engaged with said racking screw, the racking screw can be rotated between the connected and disconnected positions by a user standing to one side of the breaker and rotating the shaft about the shaft axis; and
   an engagement clip adapted to hold said gripping tool selectively-releasable engagement with said racking screw.

2. A racking tool according to claim 1, wherein the elongate shaft has a length adapted to permit racking of the breaker by a user standing outside the flash boundary.

3. A racking tool according to claim 1, wherein the elongate shaft is telescopic.

4. A racking tool according to claim 1, wherein the gripping tool is a socket tool.

5. A racking tool according to claim 1, wherein the gripping tool terminates in a square drive.

6. A tool according to claim 1, wherein the angle drive mechanism is a right-angle drive.

7. A tool according to claim 1, wherein the first end of the shaft is coupled to the angle drive mechanism by a universal joint.

8. A tool according to claim 1, wherein the second end of the shaft has a ratchet wrench secured thereto, to facilitate rotation of the shaft about the shaft axis by the user.

9. A tool according to claim 1, wherein the second end of the shaft terminates in a square drive socket, to receive, in use, the square drive of a socket wrench, to facilitate rotation of the shaft about the shaft axis by the user.

10. A tool according to claim 1, wherein said first end of the shaft is coupled to the angle drive mechanism by a cotter pin.

11. A tool according to claim 1, further comprising an aperture clip attached to said tool and configured to retain an aperture in an open position.

12. A tool according to claim 11, wherein said aperture clip further comprises a magnet for assisting said clip in retaining said aperture in said open position.

13. A tool according to claim 12, wherein said aperture clip is secured to a bushing, said bushing rotatable on said gripping tool.

14. A tool according to claim 13, wherein said aperture clip is secured to said bushing by a spring.

15. A tool according to claim 12, wherein said aperture clip is secured to said gripping tool by a bracket.

16. A tool according to claim 15, wherein said bracket is biased by a spring.

17. A tool according to claim 15, wherein said aperture clip is a jaw spring biased aperture clip.

* * * * *